United States Patent
Lockhart et al.

[11] Patent Number: 5,841,873
[45] Date of Patent: Nov. 24, 1998

[54] METHODS OF DETECTING DECRYPTION ERRORS

[75] Inventors: Thomas W. Lockhart, Richmond, Canada; Farzan Mamaghani, Bothell, Wash.; Karl A. Reardon, Surrey, Canada; William H. Kilner, Monroe, Wash.; Richard Mosher, Ladner, Canada; Bud Fraser, Vancouver, Canada; Nazira Chatur, Richmond, Canada

[73] Assignee: Motorola, Inc., Schaumburg, Ill.

[21] Appl. No.: 911,405

[22] Filed: Aug. 14, 1997

Related U.S. Application Data

[63] Continuation of Ser. No. 486,446, Jun. 8, 1995, abandoned.

[51] Int. Cl.$^6$ .................................................... H04L 9/00
[52] U.S. Cl. ................................ 380/49; 380/44; 380/47
[58] Field of Search ................................ 380/44, 47, 49; 348/5.5

[56] References Cited

U.S. PATENT DOCUMENTS

| | | | |
|---|---|---|---|
| 4,649,233 | 3/1987 | Bass et al. | 380/21 |
| 4,760,599 | 7/1988 | Okamoto et al. | 380/48 |
| 5,056,140 | 10/1991 | Kimbell | 380/23 |
| 5,163,097 | 11/1992 | Pegg | 380/21 |
| 5,227,613 | 7/1993 | Takagi et al. | 235/380 |
| 5,237,611 | 8/1993 | Rasmussen et al. | 380/21 |
| 5,363,448 | 11/1994 | Koopman, Jr. et al. | 380/23 |
| 5,404,404 | 4/1995 | Novorita | 380/21 |
| 5,428,686 | 6/1995 | Brown et al. | 380/46 |
| 5,438,622 | 8/1995 | Normile et al. | 380/46 |
| 5,483,598 | 1/1996 | Kaufman et al. | 380/43 |

OTHER PUBLICATIONS

Bruce Schneier, "Applied Cryptology: Protocols, Algorithims, and Source Code in C", 2nd edition John Wiley and Sons, N.Y. (1995) p. 179 Key–error Detection during Decryption (1st edition pp. 147–148).

Bruce Schneier, "Applied Cryptology: Protocols, Algorithms, and Source Code in C", 1st edition John Wiley and Sons, N.Y. (1992) p. 158 (2nd edition p. 194).

*Primary Examiner*—Thomas H. Tarcza
*Assistant Examiner*—Pinchus M. Laufer
*Attorney, Agent, or Firm*—Charles W. Bethards; Hugh Dunlop

[57] ABSTRACT

In a data communications system, including an infrastructure arranged to communicate over a data channel with a plurality of data terminals, a method of detecting data decryption errors in a data packet includes receiving an encrypted data packet (213); decrypting the encrypted data packet to provide a decrypted data packet; and comparing a reference value to a portion of the decrypted data packet to determine when a predetermined relationship is satisfied (221).

2 Claims, 3 Drawing Sheets

METHODS OF DETECTING DECRYPTION ERRORS

This is a continuation of application Ser. No. 08/486,446, filed Jun. 8, 1995 and now abandoned.

FIELD OF THE INVENTION

The present disclosure deals with communications systems and more particularly to methods of detecting decryption errors in data communications systems.

BACKGROUND OF THE INVENTION

In a data communications system, users have access to terminals or data terminals that are capable of receiving and transmitting data messages. In these systems, for example a wireless data communications system, the terminals may be one-way pagers, two-way pagers, portable phones, portable computers, radio modems, mobile data terminals or any other similar device. In a wireless system these terminals give the user the ability to roam throughout a geographic area, sending and receiving data as required without being tethered to a physical infrastructure or network such as in a traditional wireline telephone network.

In a data communications system messages are exchanged via a channel, either wired for traditional networks or radio carrier for wireless networks, between an infrastructure and a plurality of terminals. The terminals send and receive information from the network or infrastructure via ports that in a wireless system are an array of fixed stations or radio ports located throughout the geographic area in which the user is located. As the user moves through the geographic area, the network is accessed from different radio ports at different times. Hence, there is no permanent association established between a specific stationary radio port and a particular user—rather, all associations are temporary, changing as the user changes locale.

Unfortunately in communications systems exchanges between the terminals and the ports are vulnerable to both un-authorized interception (i.e., eavesdropping), and the un-authorized interjection of messages (i.e., fraudulent use of service). This is particularly so in wireless data communications systems given the relative ease of monitoring the channel. It is well known in the art that cryptographic systems may be employed to ensure the privacy and authenticity of messages communicated over the data channels.

Cryptographic systems rely on the sender and receiver of the data having coordinated, typically identical, cipher keys that are used both to encipher or encode and decipher or decode the data message. Various approaches to generating cipher keys are well known in the art, and many fall into one of two categories—"fixed key" and "dynamic key".

The fixed key method relies on physically programming the data terminal and the network or infrastructure with a cipher key that the network will recognize prior to the terminal going into service. The main advantages of this method is that the mobile device and the network do not need to worry about key synchronization on an ongoing basis and are not required to exchange key information over the data channel thereby risking secrecy of the key. The major disadvantage of this method is that if security is or may have been compromised the device and the network infrastructure must be re-configured with a new cipher key.

In the dynamic key method security is based on the difficulty of deducing a "private" session cipher key from public values which are sent over the unsecure data communications channel, and the difficulty of deducing the private session key from the public data. Numerous dynamic key algorithms abound in the art, including those known as Diffie-Hellman, Merkle-Hellman, Pohlig-Hellman, and Fiat-Shamir to mention a few.

The advantages of the dynamic key method are that the session cipher key does not need to be programmed into the device or the network infrastructure before the device goes into service. If or when security has or may have been compromised or as a prophylactic measure the cipher key can be dynamically changed when requested either by the user or the network operator. One disadvantage of this method and to a lesser extent the fixed key approach is that cipher keys must always be synchronized for the end user to be able to decipher data messages. In a dynamic key approach the cipher keys are changing much more frequently providing more opportunities for the wrong key to be in use.

Both the fixed and dynamic key methods are similar in that they both assume that once the cipher keys are established the sender and receiver (i.e., encoder and decoder) of the data messages are always using the correct, synchronized or coordinated cipher key. Problems have been found with this assumption and for various reasons the cipher keys may not be properly synchronized. The problems resulting when the keys are not synchronized are further exacerbated by the absence of well defined detection or remedial procedures. The absence of solid detection procedures is particularly problematic in many data communications systems where the system or infrastructure merely forwards whatever messages may have been received on to the end user.

Clearly there is a need for an improved method of detecting encryption key errors as well as remedial measures therefore.

BRIEF DESCRIPTION OF THE DRAWINGS

The features of the present invention that are believed to be novel are set forth with particularity in the appended claims. However, the invention together with further advantages thereof, may best be understood by reference to the accompanying drawings wherein:

DETAILED DESCRIPTION OF A PREFERRED EMBODIMENT

The present disclosure deals with various methods of detecting encryption or decryption errors in a data communications system having an infrastructure and a data terminal inter coupled by a channel. A preferred method embodiment of detecting data decryption errors in a data packet includes receiving an encrypted data packet; decrypting the encrypted data packet to provide a decrypted data packet, and comparing a reference value to a portion of the decrypted data packet to determine when a predetermined relationship is satisfied.

An alternative embodiment set in a similar environment is a method of encrypting a data packet so as to facilitate detection of data decryption errors in the data packet. This method includes appending a reference value to a portion of the data packet to provide an appended data packet, encrypting the appended data packet to provide an encrypted data packet, and sending the encrypted data packet.

Encryption and decryption is accomplished, respectively, with an encryption key and a decryption key. In the preferred embodiment these keys are an algebraic combination, such as an exclusive OR, of a fixed key and a dynamic key. Each of the fixed and dynamic keys are chosen so as to provide a synchronized or coordinated key pair that in a preferred symmetric key system embodiment means the keys are equivalent.

Figure 1:
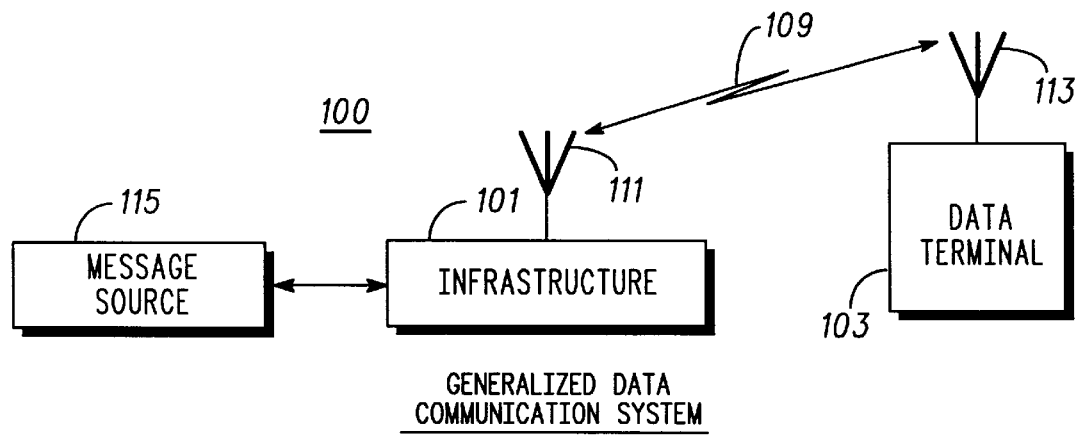
FIG. 1 is a block diagram of a data communications system suitable for employing an embodiment of the instant invention.

The instant invention can be more fully described, thus appreciated, with reference to the figures in which FIG. 1 depicts a data communications system (100). The data communications system (100) includes a message source (115), such as a public switched telephone or data network, shown coupled to an infrastructure (101). The infrastructure (101) includes, in a preferred form, a transceiver or base station coupled to an antenna (111) and operating to receive and transmit radio signals over a channel (109) that is a radio channel. The radio signals are transmitted from or received by an antenna (113) that is coupled to a data terminal (103). The data terminal (103) operates to receive and convert radio signals into data messages and vice versa in addition to establishing and maintaining the link via the channel (109) with the infrastructure (101).

It should be noted that while FIG. 1 depicts only one channel, one data terminal, and one infrastructure antenna or base station, a practical system may include a plurality of each. Generally, the data communications system (100) is intended to supply specific messages to/from specific data terminals in a largely transparent (to end users) fashion. Although FIG. 1 depicts the preferred wireless or radio data communications system, the instant invention is expected to have equal applicability to wired data communications systems. Additionally, the instant invention is expected to have applicability to data communications regardless of the specific form the data terminal may take.

The data terminal (103) is generally well known and specific elements have not been specifically depicted, however the antenna (113) is coupled to a data transceiver. The transceiver includes a receiver, transmitter, controller, and associated functions (not specifically shown) all as well known and operates to convert radio signals at the antenna (113) to a data wave form that is coupled to a data modulator and demodulator or alternatively to convert a data wave form, supplied by the data modulator/demodulator, to a radio signal for transmission over the radio channel (109).

The data modulator and demodulator operates to convert the analog data wave form, as provided by the data transceiver to a digital form or binary symbol representation, or alternatively to convert digital data to an analog wave form suitable for further transmission by the data transceiver. The digital form of the data produced by the data modulator and demodulator is provided to the controller as a data message. Digital data that is converted by the data modulator and demodulator to an analog wave form is supplied from the controller.

The controller provides various control functions for the other elements of the terminal and manages the interface between the terminal and an end user such as display, keyboard or further data link. Such control functions include data routing and various other control and programming type functions, among others. The terminal (103), including component parts as described above, are more fully described in and may be more fully appreciated by reference to the Motorola Service Manual titled InfoTAC Technical Manual and designated 68P02939C95. The data transceiver described in this manual is well known. A digital signal processor (MCM56001) is used for the data modulator and demodulator function. A Motorola HC11 controller (M68HC11A1) provides the controller functions however a MC 68300 series processor will serve equally well. The balance of the product includes generally a liquid crystal display used for various indicators, a 128K random access memory is used for the buffer, a rechargeable battery pack is the power source, a self contained antenna is used, and RS-232C serial lines are provided to connect a host device such as portable computer to the terminal (103).

Referring to the figures, specifically FIGS. 2 through 4, flow charts depicting various method embodiments associated with detection etc. of encryption errors will be described. Assuming no errors in the encryption system, a terminal (103) will be recognized by the infrastructure (101) as a valid user of the system and will be allowed to utilize the channel (109) for exchanging data communications. Generally, the depicted processes are suitable for implementation according to well known techniques in any general purpose controller, such as the above referenced processors, executing appropriate operating software that is suitable for providing a controller type function in a terminal or data terminal or an infrastructure element having a receiver, etc.

Referring additionally to the figures, the respectively depicted processes are depicted in terms of a sending device and a receiving device. Generally it should be understood that the respective methods, where so indicated, operate equally well or analogously whether the sending device is the infrastructure (101) or the data terminal (103). The descriptions below will be generally presented in terms of the sending device being the infrastructure (101) and the receiving device being the data terminal (103), however analogous discussions apply with reversed or mirrored roles.

Figure 2:
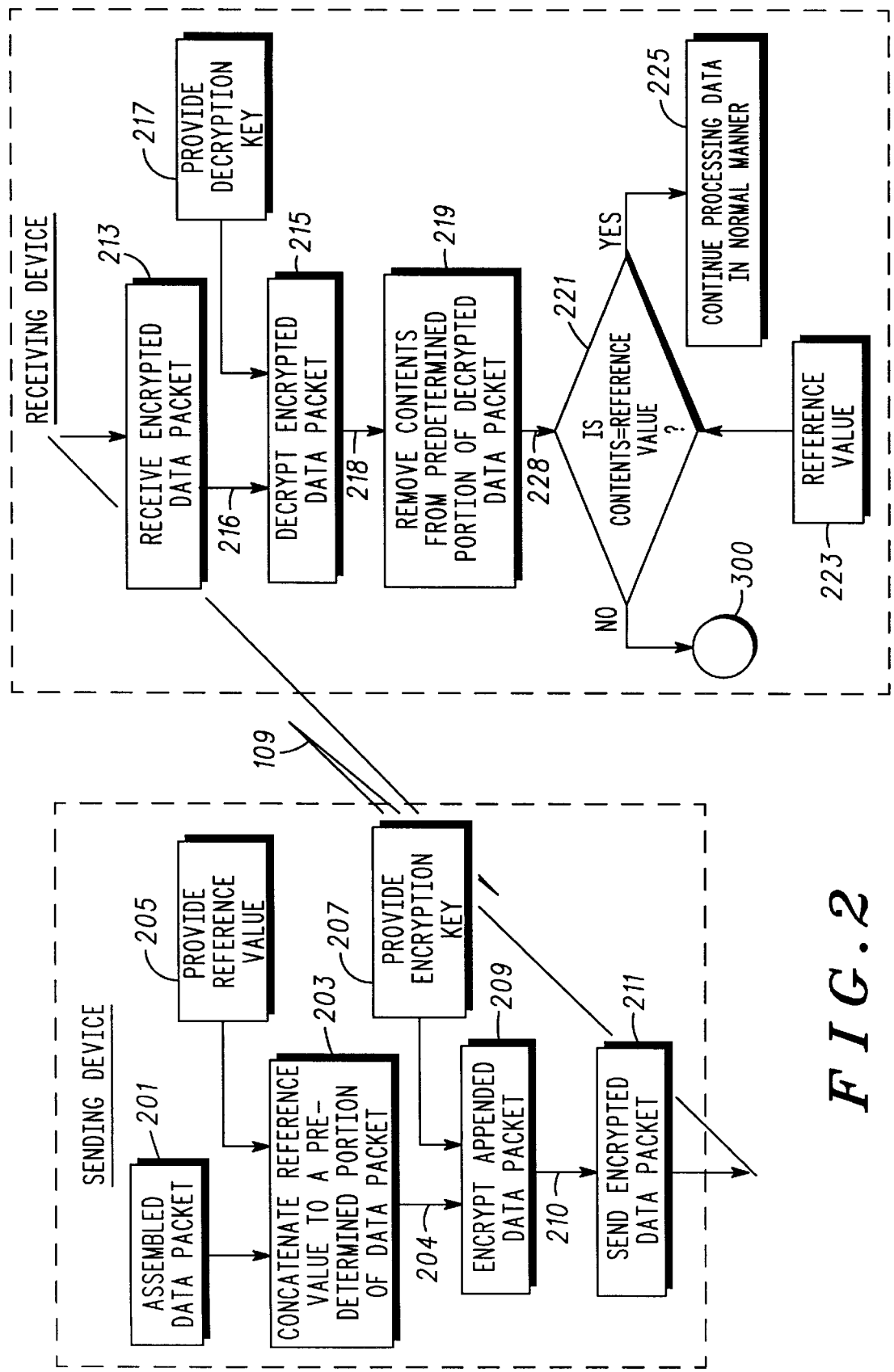
FIG. 2 is a flow chart of a preferred method embodiment of detecting data encryption or decryption errors in accordance with the instant invention.

Referring specifically to the FIG. 2 preferred method of detecting data encryption or decryption errors in an encrypted data packet, the process begins with the sending device or infrastructure (101) assembling a data packet at step (201). At step (203) a reference value supplied or provided by step (205) is appended to or concatenated to a portion of the data packet to provide an appended data packet (204). In the preferred embodiment the portion of the data packet assembled at step (201) has been pre-determined to be that which follows the last byte of the data packet, and the reference value (205) is a fixed length field (e.g. 2 bytes) of a pre-determined fixed value (e.g. ASCII characters "EN").

Several variations of step (203) are possible and are worth noting, in particular; the fixed length of the reference value (205) is not restricted to 2 bytes, but may be chosen to be a size which is appropriate for the communication system in which it is being implemented; the pre-determined contents of the reference value (205) need not be an ASCII string of the value presented here, but could be any other ASCII value, or could be a value which is computationally derived from the contents of the data packet (201) itself, such as a sum of bytes, a sum of words, a cyclical redundancy check or any other such computationally derived value; it is not critical that the reference value (205) be appended to the data packet, but could be appended to the front of the data packet, or inserted into the stream of data at a known (e.g. after the n$^{th}$ byte) or computable location (e.g. after the middle byte of the packet). However, one limitation on the reference value for the preferred embodiments, as will become clearer below, is that it must be determined and located prior to encryption of the appended data packet at step (209). Additionally any link or transport check sums such as a CRC should be added after the reference value and encryption of the data packet. The preferred implementation for appending the reference value (205) to the data packet is provided by appending a 2 byte fixed length field containing the ASCII characters "EN" after the last byte of the data packet.

At step (209) in FIG. 2, the appended data packet (204) is encrypted to provide an encrypted data packet according to standard encryption methods well known in the art, using the encryption key provided from step (207), preferably, derived according to the method which is presented below with reference to FIG. 4. At step (211), the encrypted data packet (210) is sent via the channel (109) to the receiving device or terminal.

Thereafter, referring to the receiving device portion of the FIG. 2 method, a preferred method embodiment of detecting data decryption errors in a data packet (210) begins in step (213) with reception of an encrypted data packet, specifically the one just sent, from the channel (109). This preferred embodiment assumes that the receiving device has acknowledged receipt of the data packet from the sending device and dealt with all other network transport overhead. At step (215) decryption of the encrypted data packet occurs according to standard decryption methods well known in the art, using the decryption key (217) provided from step (217), preferably, derived according to the method which is presented below with reference to FIG. 4, to obtain or provide a decrypted data packet (218).

At step (219) the contents (220) of a portion, specifically the predetermined portion from above of the decrypted data packet (218) are removed. Again for this preferred embodiment, these are the last 2 bytes of the decrypted data packet from step (203). Step (221) compares the contents (220) from step (219) with a reference value from step (223) which reference value is, preferably, predetermined as noted above as a value "EN" or as to the methodology of calculating it, to determine when a pre-determined relationship is satisfied. It should be noted that an alternative embodiment where the receiving device holds off acknowledgment of receipt of the data packet until after step (221) may be utilized.

It should also be noted that, the invention presented here, namely a method to detect decryption errors in an encrypted data packet, relies upon both the sending device and the receiving device using the same reference value, from steps (205) and (223) respectively during steps (203) and (221) respectively at least for symmetric encryption systems. The value itself, or the manner in which to derive the value from computational data, is determined by the particular implementation chosen. It should also be noted that variations to the preferred embodiment of step (203) in the sending device must be correspondingly accounted for in step (219) of the receiving device, that is to say variations in the size, the pre-determined contents, the manner in which the contents of such value are derived, and the location of the reference value in the data packet must be provided to the receiving device in order that the reference value (220) may be removed from the decrypted data packet (218). These variations will be specific to the requirements of the communications protocol in which this invention is embodied.

For the preferred embodiment presented in step (221) in FIG. 2 the contents (220) obtained from the decrypted data packet will be compared to the ASCII value "EN". At step (221) if the reference value (223) and the contents (220) have a predetermined relationship, specifically are equivalent, then no further action is required and the receiving device proceeds on to step (225) and continues processing the data in a normal manner. If the reference value (223) and the contents (220) are not equivalent a decryption error has been detected and the FIG. 2 process ends at step (300).

Figure 3:
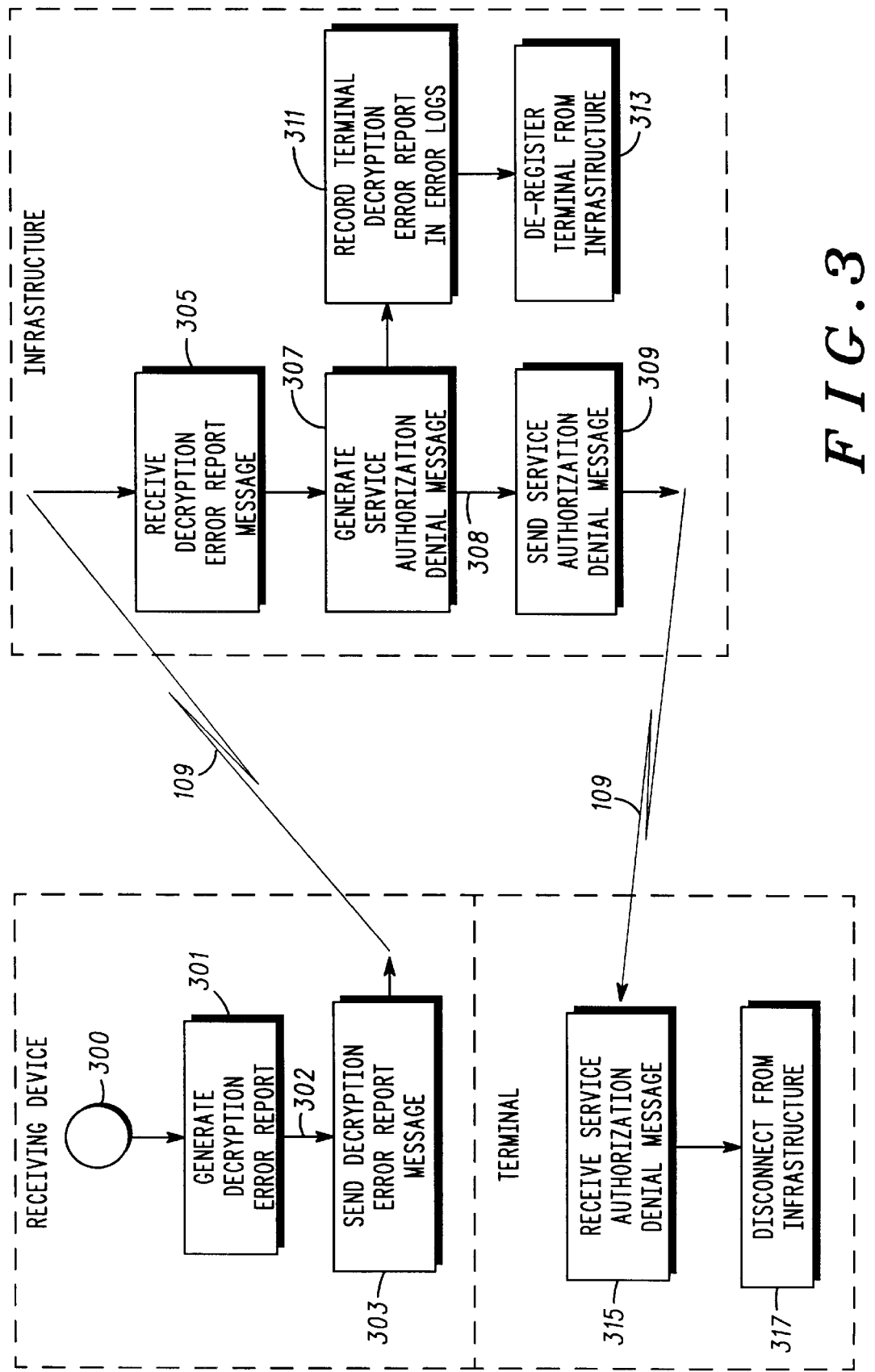
FIG. 3 is a flow chart of a preferred method embodiment of reporting encryption or decryption errors in accordance with the instant invention.

Referring to FIG. 3 which begins with (300) and depicts a preferred method of reporting and responding to encryption/decryption errors, step (301) generates a decryption error and a decryption error report message (302), formally signifying that the predetermined relationship was not satisfied. At step (303) a message corresponding to the decryption error or specifically a decryption error report message is sent over the channel (109) to the infrastructure. The decryption error report message (302) is received from the data channel (109) by the infrastructure at step (305). At step (307), having recognized the decryption error report message, the infrastructure proceeds by; generating a service authorization denial message (308). At step (309) a service authorization denial message (308) is sent via the data channel (109) and received by the terminal at step (315). At step (311) the decryption error report is recorded into the error logs maintained by the infrastructure. At step (313) the terminal is de-registered from the infrastructure utilizing the service authorization denial mechanism specific to the particular communication protocol within which this mechanism is embodied. On receipt of the service authorization denial message (308) at step (315) the terminal proceeds to step (317) and disconnects or deregisters from the infrastructure.

Figure 4:
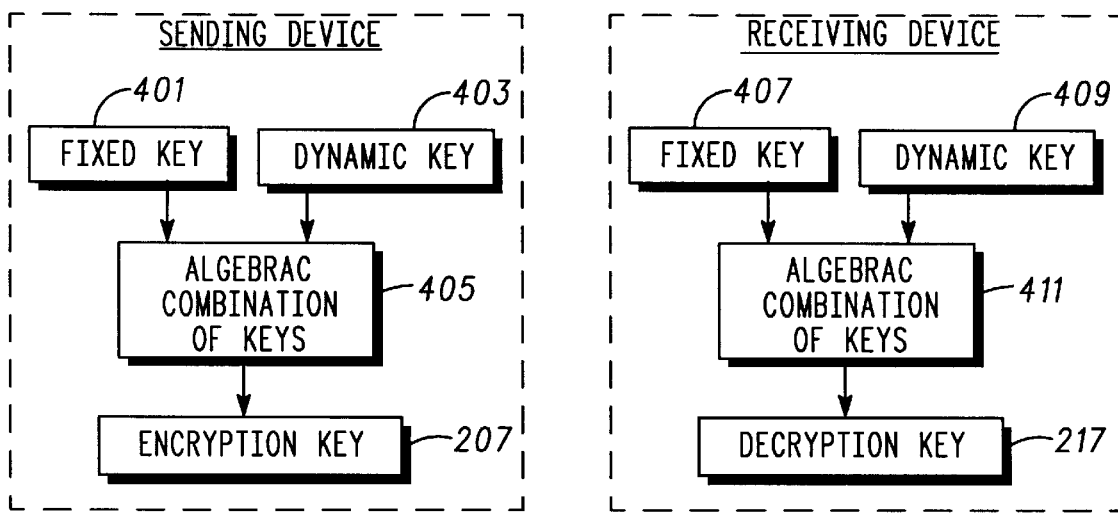
FIG. 4 is a flow chart of a preferred method embodiment of generating a encryption or decryption key in accordance with the instant invention.

Referring to FIG. 4 which depict a preferred method embodiment of generating a encryption or decryption key, the sending device and receiving device must agree upon or synchronize or coordinate a common encryption or decryption key by which to encrypt and decrypt the data packet. As noted in the Background of the Invention, a fixed key is, preferably, programmed into both the sending and receiving devices prior to the terminal going into service. Similarly, a dynamic key is negotiated and agreed upon between the sending and receiving devices, according to a dynamic key update procedure, such as the Diffie-Hellman algorithm, or other key exchange algorithms which may be found in the prior art. It is assumed that in the embodiment depicted here, that the sending device and receiving device have fixed keys of the same value, fixed keys (401) and (407) respectively. It is also assumed that the necessary key negotiation procedures have been successfully completed, and that the sending device and receiving device have mutually agreed upon dynamic keys (403) and (409) respectively, specific for the current communication session.

In particular FIG. 4 depicts the preferred method embodiment of generating the encryption or decryption keys and assumes that the sending device and receiving device use the same previously agreed upon fixed key, fixed keys provided at steps (401) and (407), respectively; that on initiation of the current communication session between the sending device and receiving device, a dynamic key is negotiated and agreed upon and these dynamic keys are provided at steps (403) and (409), for the current communication session. Thereafter the fixed and dynamic keys are algebraically combined, at steps (405) and (411), to generate a more secure encryption key at step (207) and a decryption at step (217). The preferred embodiment depicted in steps (405) and (411) combines the keys using bitwise exclusive OR, however numerous other variants may be chosen such as bitwise exclusive NOR, exponential equations, elliptic curve equations, or whatever other algebraic technique may be found to provide the desired result. It should be noted that each of the fixed and dynamic keys are chosen so as to provide a synchronized or coordinated key pair that in a preferred symmetric key system embodiment means the keys are equivalent.

The preferred embodiment depicted by the figures in FIG. 4 is superior to either the fixed key or dynamic key mechanisms alone, because the likelihood that an unauthorized user could successfully deduce three components, namely the fixed key, the dynamic key, and the algebraic function, as implemented in a communications system, is significantly diminished over the chances of deducing any one. Consequently, the method for deriving an encryption/decryption key pair depicted in FIG. 4, achieves a greater degree of security than by using either the fixed key or dynamic key methods alone. Furthermore the methods and processes disclosed here for detecting a cryptography error provides the significant advantage of allowing errors due to key synchronization problems to be isolated from errors caused by the channel and detected by the transport protocol, thereby allowing for remedial actions tailored to each to be implemented.

It will be apparent to those skilled in the art that the disclosed invention may be modified in numerous ways and may assume many embodiments other than the preferred form specifically set out and described above. Accordingly, it is intended by the appended claims to cover all modifications of the invention which fall within the true spirit and scope of the invention.

What is claimed is:

1. In a data communications system, including an infrastructure arranged to communicate messages comprising user information data over a data channel with a plurality of data terminals, a method of operation of one of said plurality of data terminals, the method comprising the steps of:

receiving an encrypted data packet;

decrypting said encrypted data packet using a decryption key to provide a decrypted data packet;

comparing a reference value to a portion of said decrypted data packet to determine when a predetermined relationship is satisfied thereby detecting a decryption error in said user information data;

generating a decryption error report message when said predetermined relationship is not satisfied such that said decryption error is detected in said user information data;

sending the decryption error report message corresponding to said decryption error to the infrastructure;

receiving a service authorization denial message responsive to said step of sending; and disconnecting from the infrastructure, responsive to said step of receiving said service authorization denial message.

2. In a data communications system, including an infrastructure arranged to communicate messages comprising user information data over a data channel with a plurality of data terminals, a method of detecting data decryption errors in a data packet, the method including the steps of:

at the infrastructure:

providing a data packet for transmission, which includes a reference value at a predetermined location in the data packet;

encrypting the data packet using a data decryption algorithm and a data decryption key to provide an encrypted data packet;

adding a check sum to the encrypted data packet; and transmitting the encrypted data packet; at a data terminal:

receiving the encrypted data packet;

checking said encrypted data packet for transmission errors using said check sum;

when no transmission errors are present, decrypting said encrypted data packet using a data decryption algorithm and a data decryption key to provide a decrypted data packet;

comparing data received in said predetermined location of said decrypted data packet to determine when a predetermined relationship is satisfied thereby detecting a decryption error in said user information data;

concluding that a data decryption error has occurred within one of the data decryption key and the data decryption algorithm if the predetermined relationship is not satisfied such that said decryption error is detected in said user information data;

sending a decryption error report message to the infrastructure when a data encryption error has occurred; and at the infrastructure:

receiving the decryption error report message; and sending a service authorization denial message to the data terminal in response to the decryption error report message.

* * * * *